3,498,968
p-CHLOROAZO COMPOUNDS

Peter Dimroth and Kurt Mayer, Ludwigshafen (Rhine), Germany, assignors to Badische Anilin- & Soda-Fabrik Aktiengesellschaft, Ludwigshafen (Rhine), Germany
No Drawing. Filed June 8, 1965, Ser. No. 462,406
Claims priority, application Germany, June 16, 1964,
B 77,270
Int. Cl. C09b 43/00; C07c 107/04
U.S. Cl. 260—205      2 Claims

ABSTRACT OF THE DISCLOSURE

Production of a p-chloroazo compound by reacting an aromatic azo compound bearing a hydroxy group in p-position to the azo group with phosgene in an inert organic solvent and in the presence of an N,N-disubstituted carboxylic amide. The resulting compounds are useful as pesticides or as a source of typical azo dyes.

---

This invention relates to a process for the production of organic compounds containing chlorine. It relates particularly to the production of azo compounds which bear in one of the two para-positions to the azo grouping a chlorine atom, with or without further susbtituents in other positions.

We have found that p-chloroazo compounds are obtained when an aromatic compound which bears a hydroxyl group in p-position to an azo group is reacted with phosgene in an inert organic solvent in the presence of an N,N-disubstituted carboxylic amide.

It is an advantage of the invention that it makes available a large number of compounds (some of them new) from which, for example, very valuable substances may be prepared, in particular fast dyes and other valuable substances, as for example biocides. By the new process it is possible to carry out a chlorination with elimination of a hydroxyl group previously present (which has not hitherto been possible) in a particularly simple way which is surprising as compared with prior art methods.

Azo compounds containing hydroxyl groups which are used as initial materials for the new process may be obtained by known reactions, for example by coupling diazo compounds to aromatic hydroxyl compounds having an unsubstituted p-position. Examples of suitable compounds are: the coupling products of aniline, the toluidines, chloroanilines, nitroanilines, nitrochloroanilines, nitrotoluidines, nitroaminoanisols, N,N - dialkylsulfanilamides and the halogenation products of these compounds and those of benzidine, 1-amino-4-chloro-naphthalene and the like with aromatic hydroxyl compounds which do not contain a substituent in p-position, such as phenol, o-cresol, m-cresol, o-chlorophenol, m-chlorophenol, o-nitrophenol, m-nitrophenol, 2-chloro-6-nitrophenol, esters of salicylic acid, α-naphthol and so on. Other monoazo or disazo phenols or naphthols which contain substituents of any type which are inert under the reaction conditions are however also suitable as initial materials for the new process. Examples of such inert substituents are halogen atoms, nitro, alkoxy, carboxylic ester carbonamido, substituted carbonamido, sulfonamido, substituted sulfonamido, alkyl, especally lower alkyl, and alkylsulfone groups.

Para-chloroazo compounds obtained by the new reaction have the general formula

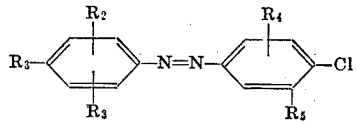

wherein $R_1$ is a member selected from the group consisting of a chlorine atom and nitro, carboxylic ester phenyl azo and sulfonamido groups, $R_2$ and $R_3$ are members selected from the group consisting of hydrogen atoms, halogen atoms and nitro, alkoxy, lower alkyl and carboxylic ester groups, $R_4$ is a member seletced from the group consisting of a hydrogen atom, a chlorine atom and alkoxy, lower alkyl and carboxylic ester groups and $R_5$ is a member selected from the group consisting of a hydrogen atom and nitro and carboxylic ester groups. Among the compounds having the above general formula, those compounds which have the following general formula are new:

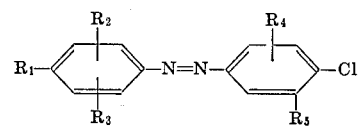

where $R_1$ is a member selected from the group consisting of a chlorine atom, and nitro, carboxylic ester, phenyl azo and sulfonamido groups, $R_2$ and $R_3$ are members selected from the group consisting of hydrogen atoms, chlorine and bromine atoms and nitro, alkoxy, lower alkyl and carboxylic ester groups, $R_4$ is a member selected from the group consisting of a hydrogen atom, chlorine atom and alkoxy, lower alkyl and carboxylic ester groups and $R_5$ is a member selected from the group consisting of nitro and carboxylic ester groups.

Among the N,N-dialkyl substituted carboxylic amides those are particularly suitable which contain lower alkyl radicals having up to about four carbon atoms and which are derived from carboxylic acids having up to six carbon atoms. Preferred compounds are N,N-dimethyl formamide and tearamethyl urea.

Examples of dialkyl carboxylic amides which are suitable for the new process are diethyl formamide, dipropyl formamide, dimethyl acetamide, dibutyl caproamide, dimethyl stearamide, tetramethyl adipic diamide, N-alkyl lactams having five to thirteen ring members and one to four carbon atoms in the alkyl radical, tetraalkyl ureas having one to four carbon atoms in the alkyl radical, N-formylated cyclic imines having five to seven ring members, such as N-formylpyrrolidine, N-formylmorpholine and N,N'-bis-formylpiperazine.

The amount of phosgene used for chlorination in the new process may vary within wide limits; in general at least 1 mole (with reference to the initial material used) is used provided the initial material contains only one hydroxyl group. If more than one hydroxyl group is present, correspondingly larger amounts of phosgene are naturally required for complete reaction of the hydroxyl groups.

The N,N-disubstituted carboxylic acid amides used in the new process are used in catalytic amounts, i.e. from about 1 to about 30% by weight, particularly from 3 to 10% by weight, with reference to the initial materials used.

The temperatures chosen are usually from 40° to 200° C., particularly from 70° to 140° C., but higher reaction temperatures may also be used.

All organic liquids which are inert under the reaction conditions are suitable as organic solvents or diluents, for example toluene, chlorobenzene, dichlorobenzene, nitrobenzene, decahydronaphthalene and the like. They may be used in the ratio of 1:1 to 1:10 and the more concentrated reaction media (for example dilution ratios of from about 1:2 to about 1:4) are advantageous. It is possible, but not necessary, to use superatmospheric pressure.

The products are in general worked up by conventional methods for example by suction filtration and if desired subsequent washing, for example with methanol or benzene.

It is peculiar that when using known chlorinating agents, as for example phosphorus pentachloride, sulfuryl chloride of benzenesulfonyl chloride, the p-position of the initial materials for the new process cannot be substituted. It is therefore surprising that phosgene, which reacts by elimination of hydrogen chloride, should give a smooth reaction with these basic azo compounds with substitution of the hydroxyl groups if N,N-disubstituted carboxylic amides be used as catalysts.

The compounds obtainable by the new process (some of which are new) may be used as biocides, for example as pesticides, and also as intermediates for the production of dyes.

The invention is illustrated by the following examples. The parts specified in the examples are parts by weight.

EXAMPLE 1

288 parts of 3,4'-dinitro-4-hydroxy-azobenzene is suspended in 900 parts of dichlorobenzene. 10 parts of dimethylformamide is added and a powerful current of phosgene is passed through the mixture which is heated to 115° C. Four hours later it is allowed to cool and the product is suction filtered, washed with methanol and dried. 220 parts of the compound having the formula:

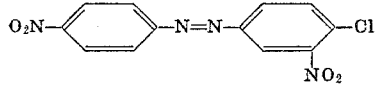

is obtained.

*Analytical values.*—Calculated: Chlorine, 11.4%; nitrogen, 18.3%. Found: Chlorine, 11.8%; nitrogen 17.5%.

EXAMPLE 2

The procedure of Example 1 is followed but 3,4'-dinitro-4-hydroxyazobenzene is replaced by the azophenols or azonaphthols shown in the following table, together with the solvents in the ratios and at the temperatures given in the table. The amounts of p-chloroazo compounds given in the table are obtained.

Initial material

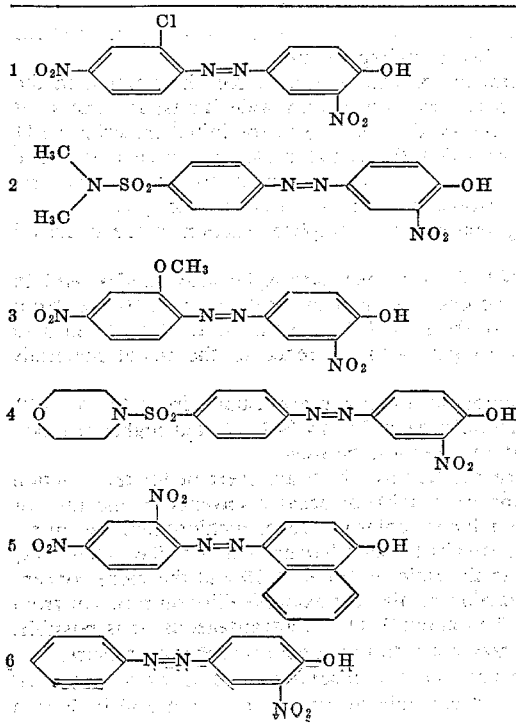

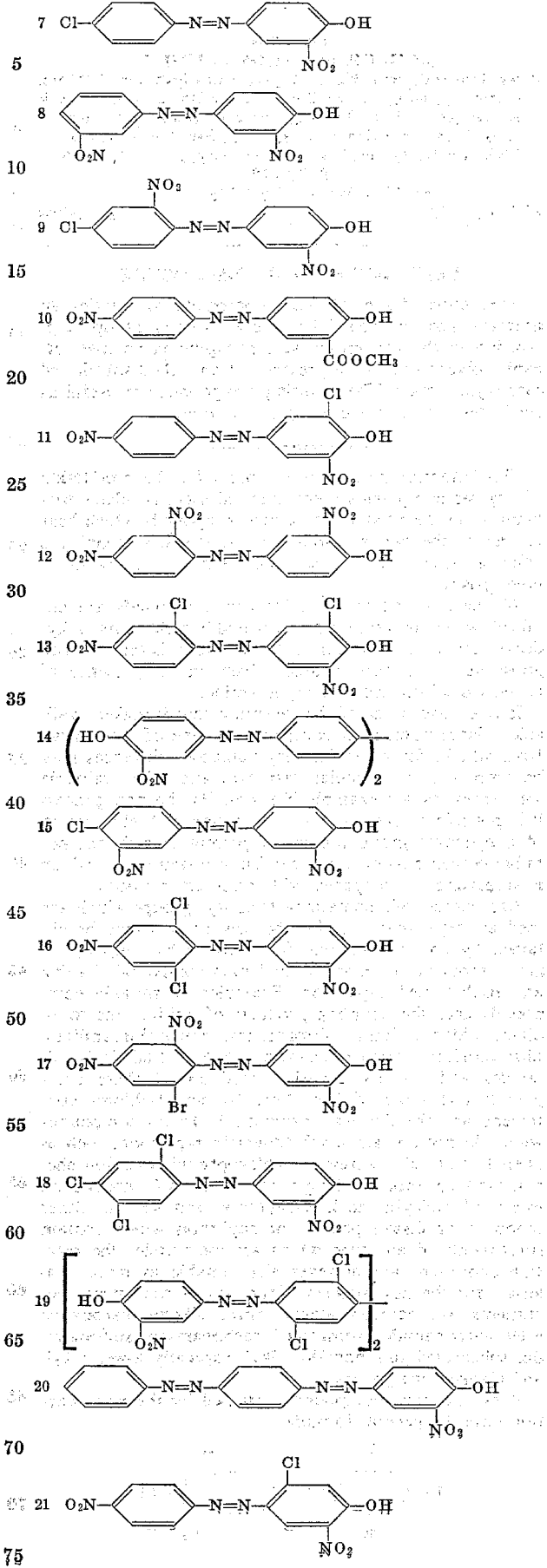

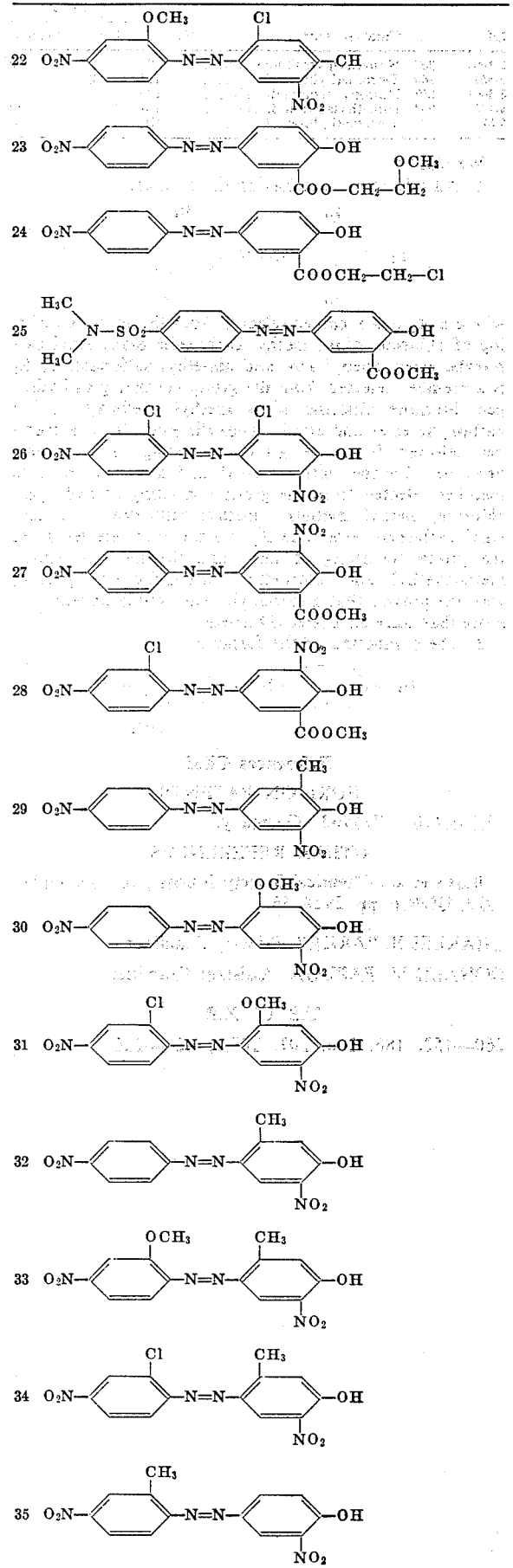
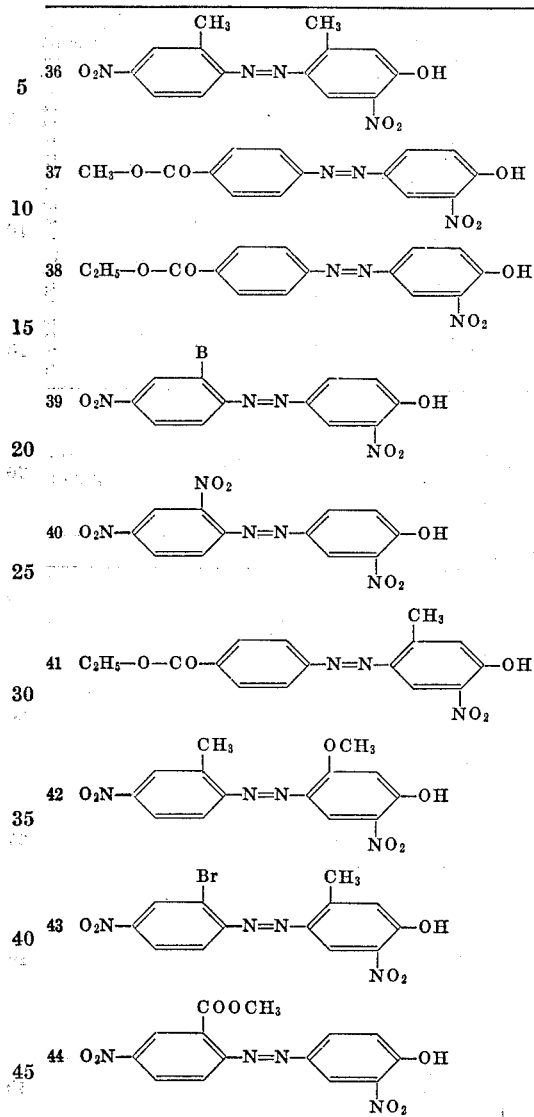

The columns in the following table have the following significance:

IM = which of the above initial materials is used and the amount used is given in brackets
Solvent = the solvent used and the amount used in brackets
DM = the amount of dimethylformamide used
T ° C. = the reaction temperature in ° C.
Yield (p, percent) = the yield in parts and percentage.

| IM | Solvent | DM | T., ° C. | Yield Parts | Yield Percent |
|---|---|---|---|---|---|
| 1(112) | Toluene (350) | 5 | 110 | 86 | 73 |
| 2(50) | o-Dichlorobenzene (250) | 2 | 120 | 41 | 78 |
| 3(100) | o-Dichlorobenzene (500) | 5 | 120 | 72 | 68 |
| 4(350) | o-Dichlorobenzene (700) | 12 | 120 | 282 | 77 |
| 5(150) | o-Dichlorobenzene (400) | 6 | 120 | 67 | 43 |
| 6(127) | Toluene (190) | 6 | 105 | 55 | 40 |
| 7(210) | o-Dichlorobenzene (420) | 8 | 90 | 180 | 80 |
| 8(230) | o-Dichlorobenzene (460) | 12 | 120 | 142 | 58 |
| 9(155) | Toluene (280) | 10 | 105 | 73 | 45 |
| 10(200) | Chlorobenzene (300) | 20 | 105 | 131 | 62 |
| 11(50) | o-Dichlorobenzene (100) | 3 | 120 | 25 | 48 |
| 12(111) | o-Dichlorobenzene (200) | 10 | 120 | 73 | 69 |
| 13(100) | Benzene (200) | 5 | 80 | 65 | 62 |
| 14(50) | o-Dichlorobenzene (125) | 2 | 120 | 20 | 38 |
| 15(35) | o-Dichlorobenzene (100) | 2 | 110 | 22 | 60 |
| 16(125) | o-Dichlorobenzene (250) | 10 | 120 | 84 | 64 |
| 17(103) | Toluene (200) | 10 | 105 | 40 | 37 |
| 18(120) | Toluene (360) | 10 | 105 | 92 | 73 |
| 19(170) | o-Dichlorobenzene (340) | 13 | 120 | 77 | 32 |
| 20(100) | o-Dichlorobenzene (300) | 10 | 130 | 102 | 97 |
| 21(119) | o-Dichlorobenzene (220) | 10 | 120 | 82 | 65 |
| 22(149) | o-Dichlorobenzene (300) | 12 | 120 | 71 | 45 |
| 23(60) | o-Dichlorobenzene (150) | 5 | 120 | 30 | 47 |
| 24(80) | o-Dichlorobenzene (160) | 8 | 120 | 41 | 50 |
| 25(100) | o-Dichlorobenzene (250) | 10 | 120 | 48 | 46 |

| IM | Solvent | DM | T., °C. | Yield Parts | Yield Percent |
|---|---|---|---|---|---|
| 26(150) | o-Dichlorobenzene (150) | 15 | 130-140 | 114 | 70 |
| 27(160) | o-Dichlorobenzene (190) | 16 | 120 | 95 | 57 |
| 28(103) | o-Dichlorobenzene (200) | 10 | 120 | 23 | 44 |
| 29(109) | o-Dichlorobenzene (220) | 11 | 120 | 86 | 75 |
| 30(155) | o-Dichlorobenzene (300) | 15 | 120 | 96 | 59 |
| 31(120) | o-Dichlorobenzene (240) | 6 | 120 | 85 | 68 |
| 32(141) | o-Dichlorobenzene (280) | 14 | 120 | 119 | 85 |
| 33(150) | o-Dichlorobenzene (350) | 15 | 140 | 97 | 61 |
| 34(135) | o-Dichlorobenzene (330) | 13 | 120 | 88 | 62 |
| 35(151) | o-Dichlorobenzene (225) | 15 | 120 | 108 | 68 |
| 36(158) | o-Dichlorobenzene (230) | 16 | 120 | 108 | 65 |
| 37(135) | o-Dichlorobenzene (270) | 13 | 100 | 130 | 91 |
| 38(263) | o-Dichlorobenzene (520) | 26 | 120 | 216 | 78 |
| 39(270) | Toluene (675) | 27 | 100-110 | 180 | 64 |
| 40(240) | o-Dichlorobenzene (480) | 24 | 120 | 181 | 71 |
| 41(275) | o-Dichlorobenzene (550) | 27 | 120 | 141 | 49 |
| 42(160) | o-Dichlorobenzene (320) | 16 | 120 | 86 | 51 |
| 43(200) | o-Dichlorobenzene (400) | 20 | 120 | 139 | 66 |
| 44(116) | o-Dichlorobenzene (280) | 11 | 120 | 90 | 74 |

EXAMPLE 3

The procedure of Example 2 is followed but using the catalysts, initial materials and reaction conditions shown in the following table:

Initial material

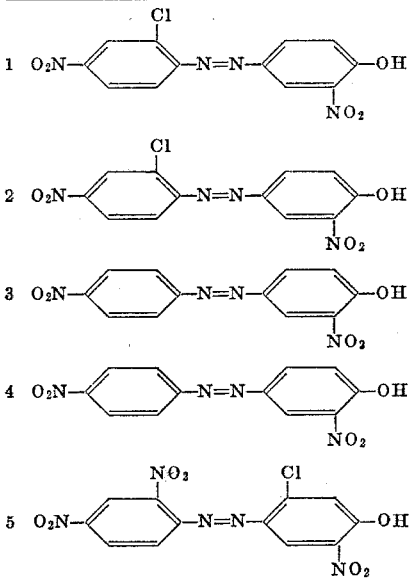

In the following table, S gives the amount (in parts) of o-dichlorobenzene used as solvent.

| IM | S | Catalyst (parts) | T., °C. | Yield Parts | Yield Percent |
|---|---|---|---|---|---|
| 1(100) | 250 | N-methylpyrrolidone (10) | 120 | 25 | 23 |
| 2(65) | 160 | Tetramethylurea (6) | 120 | 42 | 61 |
| 3(100) | 250 | Dipropylformamide (10) | 120 | 58 | 54 |
| 4(100) | 250 | Dimethylacetamide (10) | 120 | 34 | 32 |
| 5(87) | 90 | Tetramethylurea (9) | 130 | 24 | 26 |

We claim:
1. An azo compound having the formula

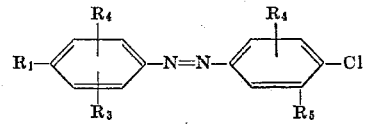

wherein $R_1$ is a member selected from the group consisting of chlorine, nitro, methyl carboxylic ester, ethyl carboxylic ester, phenyl azo, and dimethyl sulfonamido, $R_2$ is a member selected from the group consisting of hydrogen, bromine, chlorine, nitro, methyl, methoxy, methyl carboxylic ester and ethyl carboxylic ester, $R_3$ is a member selected from the group consisting of hydrogen, bromine, chlorine, nitro, methyl and methoxy, $R_4$ is a member selected from the group consisting of hydrogen, chlorine, methyl, methoxy, methyl carboxylic ester and ethyl carboxylic ester and $R_5$ is a member selected from the group consisting of nitro and the methyl-, ethyl-, methoxyethyl- and chloroethyl- carboxylic ester groups, with the proviso that a carboxylic ester group appears not more than once on a phenyl nucleus.

2. The compound of the formula

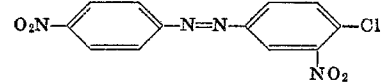

References Cited

FOREIGN PATENTS 1,133,716   7/1962   Germany.

OTHER REFERENCES

Burns et al.: Chemical Society Journal, July-December 1928, QDIC6, pp. 2928-36.

CHARLES B. PARKER, Primary Examiner

DONALD M. PAPUGA, Assistant Examiner

U.S. Cl. X.R.

260—152, 186, 206, 207, 207.1; 424—226

PO-1050
(5/69)

UNITED STATES PATENT OFFICE
CERTIFICATE OF CORRECTION

Patent No. 3,498,968          Dated March 3, 1970

Inventor(s) Peter Dimroth et al

It is certified that error appears in the above-identified patent and that said Letters Patent are hereby corrected as shown below:

Column 1, line 51, "pounds" should read --pounds,--.

Column 2, line 35, "tearamethyl" should read --tetramethyl--.

Column 6, formula 39, that portion of the formula reading "B" should read --Br--.

Column 8, claim 1, that portion of the formula reading

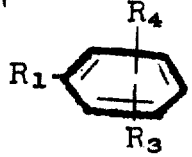

should read --

$R_1 \!\!-\!\!\bigcirc\!\!\!\!\begin{smallmatrix}R_2\\[2pt]R_3\end{smallmatrix}$

--.

SIGNED AND
SEALED

JUL 28 1970

(SEAL)
Attest:

Edward M. Fletcher, Jr.
Attesting Officer

WILLIAM E. SCHUYLER, JR.
Commissioner of Patents